(12) United States Patent
Reisch et al.

(10) Patent No.: US 7,252,608 B2
(45) Date of Patent: Aug. 7, 2007

(54) AUTOMATIC TRANSMISSION HAVING AT LEAST TWO CONICAL DISK SETS

(75) Inventors: Matthias Reisch, Ravensburg (DE); Olrik Weinmann, Eriskirch (DE); Bernhard Sich, Friedrichshafen (DE); Michael Ebenhoch, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 29 days.

(21) Appl. No.: 10/514,460

(22) PCT Filed: May 16, 2003

(86) PCT No.: PCT/EP03/05147

§ 371 (c)(1), (2), (4) Date: Nov. 16, 2004

(87) PCT Pub. No.: WO03/098074

PCT Pub. Date: Nov. 27, 2003

(65) Prior Publication Data

US 2006/0178239 A1   Aug. 10, 2006

(30) Foreign Application Priority Data

May 22, 2002   (DE) .................. 102 22 520

(51) Int. Cl.
*F16H 55/56* (2006.01)

(52) U.S. Cl. ........................... 474/8; 474/80

(58) Field of Classification Search .................. 474/8, 474/17, 18, 23, 25, 30, 35, 40, 49, 59, 79, 474/80, 83, 107, 19
See application file for complete search history.

(56) References Cited

U.S. PATENT DOCUMENTS

| 2,827,795 | A | * | 3/1958 | Caballeros | 474/9 |
| 3,757,594 | A | | 9/1973 | Kumm | |
| 3,948,111 | A | | 4/1976 | Dittrich | |
| 5,127,882 | A | | 7/1992 | Mantovaara | |
| 5,169,365 | A | * | 12/1992 | Friedmann | 474/18 |
| 5,236,395 | A | * | 8/1993 | Lucich et al. | 474/69 |
| 5,254,043 | A | * | 10/1993 | Ling | 474/69 |
| 2001/0016527 | A1 | | 8/2001 | Hiroshima et al. | |
| 2002/0068660 | A1 | | 6/2002 | Fritzer et al. | |
| 2003/0144097 | A1 | * | 7/2003 | Brandsma et al. | 474/8 |
| 2003/0166426 | A1 | * | 9/2003 | Anderson | 474/8 |
| 2004/0102267 | A1 | * | 5/2004 | Murakami et al. | 474/69 |
| 2005/0221931 | A1 | * | 10/2005 | Izumi et al. | 474/69 |

FOREIGN PATENT DOCUMENTS

DE   2 044 359   2/1972

(Continued)

*Primary Examiner*—Richard Ridley
*Assistant Examiner*—James Pilkington
(74) *Attorney, Agent, or Firm*—Davis Bujold & Daniels, P.L.L.C.

(57) ABSTRACT

An automatic transmission (1) is described, having a variator (5) that comprises at least two conical disk sets (2, 3), such that a wrap-around element (4) is guided via the conical disk sets (2, 3) for torque transmission with continuous variation of the transmission ratio. In this, the arrangement of the rotation axes of two conical disks of at least one conical disk set relative to one another can be varied.

10 Claims, 5 Drawing Sheets

FOREIGN PATENT DOCUMENTS

| | | |
|---|---|---|
| DE | 2 324 998 | 6/1974 |
| DE | 2 058 399 | 7/1974 |
| DE | 30 00 264 | 7/1980 |
| DE | 37 02 131 C1 | 2/1988 |
| DE | 689 26 298 T2 | 12/1996 |
| DE | 100 60 149 A1 | 7/2001 |
| DE | 101 39 121 A1 | 3/2002 |
| EP | 0 389 030 B1 | 11/1993 |
| EP | 0 711 934 A1 | 5/1996 |
| GB | 165107 | 6/1922 |
| GB | 2 041 116 A | 9/1980 |
| JP | 2002-206605 A | 7/2002 |
| WO | WO/03021134 A1 | 3/2003 |

* cited by examiner

AUTOMATIC TRANSMISSION HAVING AT LEAST TWO CONICAL DISK SETS

The invention concerns an automatic transmission having at least two conical disk sets, of the type defined in more detail in the preamble of claim 1.

In automatic transmissions known from the prior art, which consist of continuously variable wrap-around transmissions or so-termed CVT systems, two conical disks each forming a conical disk set are usually arranged opposite one another on a shaft and can be axially moved or displaced relative to one another. A transmission ratio change in such an automatic transmission is carried out by changing the distance between the conical disks of the respective conical disk sets. This distance change brings about a change of the radius or diameter of an area in which the belt is wrapped around the conical disks of the conical disk set.

In the known wrap-around transmissions the transmission ratio adjustment is initiated, in the conical disk set in which the distance between the conical disks is to be changed, by increasing or decreasing the axial pressure force between one conical disk, the belt and the other conical disk. Due to this force increase or reduction the belt, in its contact area on the conical disks, is forced into a spiral path so that it moves on a larger or smaller path radius.

Particularly in dry wrap-around transmissions the friction between the conical disks and the belt is relatively high, so that a self-inhibition takes place between the belt and the conical disks during transmission ratio adjustment and the belt cannot slip radially outwards on the conical disks from a smaller to a larger wrap-around diameter. Rather, during ratio adjustment a high pressure is exerted on the belt.

Particularly in the contact area of the belt on the conical disks at the point where the belt is guided out of engagement with the conical disks of a conical disk set, high pinching forces occur which result in undesirably severe belt wear and high heat evolution.

Furthermore, in the known wrap-around transmissions high mechanical adjustment forces are needed for a transmission ratio adjustment, and these increase disproportionately with increasing adjustment speed and can only be applied by very powerful mechanical actuators. In this, the mechanical load-bearing ability or strength of the belt sets a limit, which at the same time restricts the adjustment speed during transmission ratio change.

This leads to the disadvantage that with such automatic transmissions the often necessary variator adjustment speeds are not reached, as for example when during a full braking operation from average driving speeds with the variator set at its maximum transmission ratio, it has to be shifted back to a position equivalent to the start-up ratio.

Thus, to ensure good driving comfort and enable good start-up behaviour, in practice it is necessary among other things to arrange a starting clutch on the drive output side or to provide a separate start-up gear in a CVT automatic transmission. In this, the arrangement of a starting clutch on the drive output side has, in particular, the disadvantage that additional flywheel masses have to be provided, which result in undesired enlargement of the automatic transmission and increase its manufacturing costs.

The purpose of the present invention is to provide an automatic or continuously variable wrap-around transmission in which the transmission ratio can be adjusted with low adjustment forces and little wear, and which is characterized by high adjustment speeds.

According to the invention this objective is achieved by an automatic transmission having the characteristics of Claim 1.

In the automatic transmission according to the invention the arrangement of two rotation axes of two conical disks of a conical disk set is variable relative to one another, where in the present context arrangement of two rotation axes of two conical disks of a conical disk set means an aligned arrangement of the rotation axes, an arrangement in which the rotation axes intersect and enclose an angle between them, an arrangement with the rotation axes parallel to one another, or a skewed arrangement of the two rotation axes, among others.

Starting from an aligned and parallel arrangement of the rotation axes of two conical disks of a conical disk set, the variability of the arrangement provides in particular the possibility of changing this arrangement in a controlled manner such that at least a first conical disk is displaced relative to a second conical disk of a conical disk set so that the two rotation axes of the conical disks of the conical disk set enclose an angle. In this way a run-in radius of the belt in a wrap-around area on the conical disk set and a run-out radius of the belt from the wrap-around area are increased or decreased.

This causes an equidistant between the two conical disks of the conical disk set that corresponds to the width of the belt, which is in the form of a circular line when the rotation axes of the conical disks of the disk set are aligned, to assume at least approximately the shape of a spiral which is followed by the run of the belt. Depending on the change of the arrangement and the consequent change of the run-in and run-out radius, the belt "screws" up or down to a larger or smaller wrap-around radius between the two conical disks of a conical disk set, until the desired transmission ratio is reached.

With this procedure high adjustment speeds can be achieved with low adjustment powers, since in contrast to the adjustment devices known from the prior art, in which a ratio shift is carried out by pushing the conical disks of a conical disk set and the belt in the axial direction of the disk set, the belt can be brought to its new position in a very short time without any substantial increase of the axial forces acting on a conical disk set.

The higher adjustment speeds during transmission ratio shifts of the automatic transmission according to the invention, compared with automatic transmissions known from the prior art, have for example the advantageous result that in the case of full braking from an average driving speed with speed reduction until the vehicle is at rest, an initially set high ratio of the automatic transmission can be shifted down completely to a low, starting ratio for a starting process effected immediately in time after the full braking.

This also allows the possibility of arranging a starting clutch on the primary side, i.e. on the drive input side, which on the one hand reduces the manufacturing costs of the automatic transmission and on the other hand saves structural space.

The reduced structural space requirement compared with an arrangement with a starting clutch on the drive output side, arises because if the starting clutch is arranged on the drive input side a flywheel provided in the transmission input area can be used as the flywheel mass for the starting clutch, so that only the lining plates and a disengagement mechanism for releasing the starting clutch arranged on the drive input side need be provided.

Furthermore, the change of arrangement between the rotation axes of two conical disks of a conical disk set advantageously enables the efficiency of a variator of the automatic transmission to be increased even in a steady operating range, i.e., during operation of the automatic transmission without any transmission ratio change, since by virtue of the change of arrangement of the rotation axes "natural" spiral running of the belt can be counteracted so that the spiral running is reduced and the pinching force pushing the belt out of the conical disk set is minimized. In this way a real spiral-shaped path of the belt between two conical disks of a conical disk set is approximated to an ideal, at least approximately circular path, and power loss is reduced.

Other advantages and advantageous design features of this object of the invention emerge from the claims, the description and the drawing.

Several advantageous example embodiments of the automatic transmission according to the invention are illustrated in the drawing in a schematic and simplified way, and will be explained in some detail in the description below, the same indexes being used in the description for the same or functionally equivalent components. The drawing shows:

Figure 1:
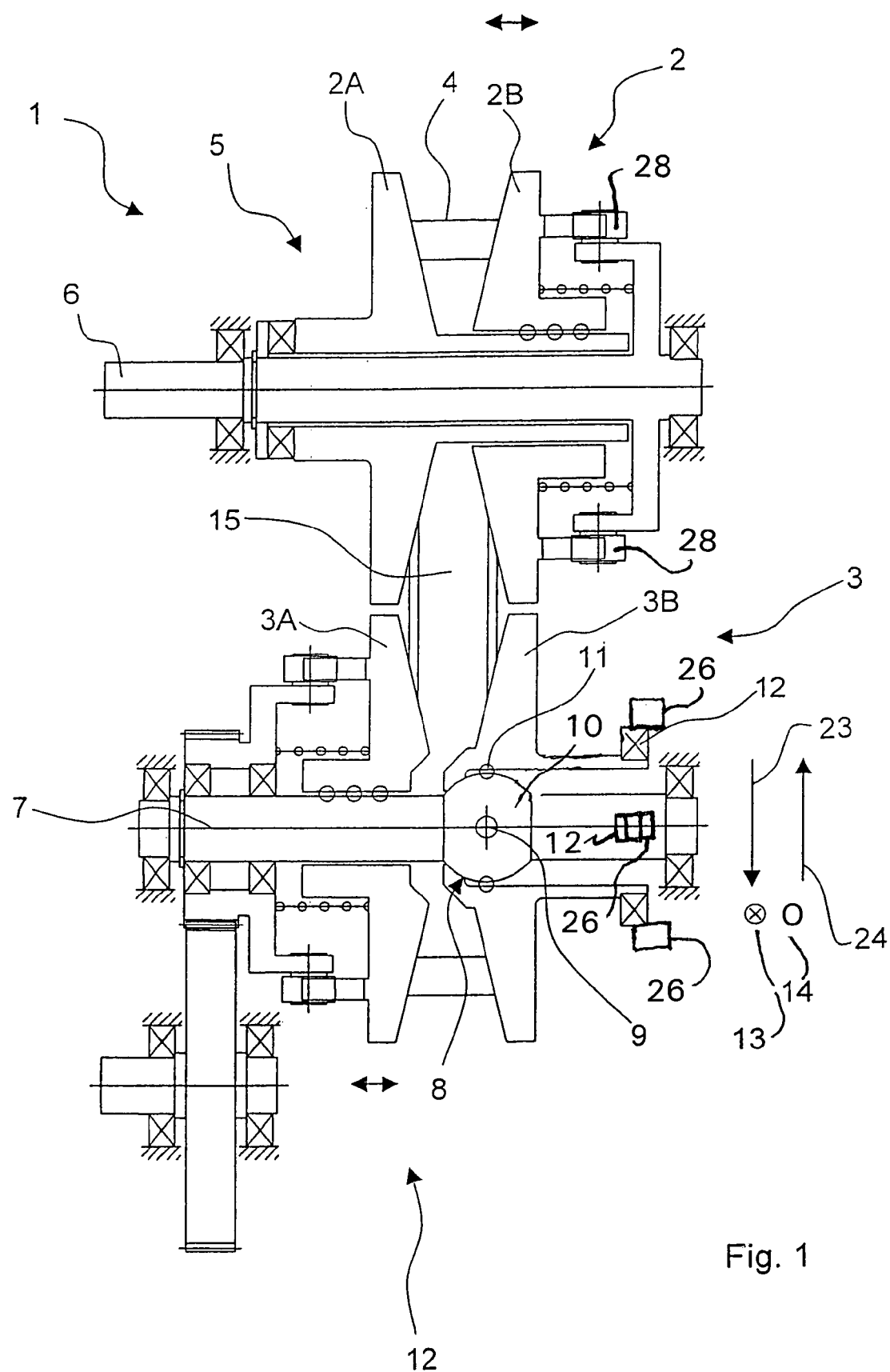
FIG. 1 is a very schematic partial sectional view of a variator of a continuously variable automatic transmission.
Figure 6:
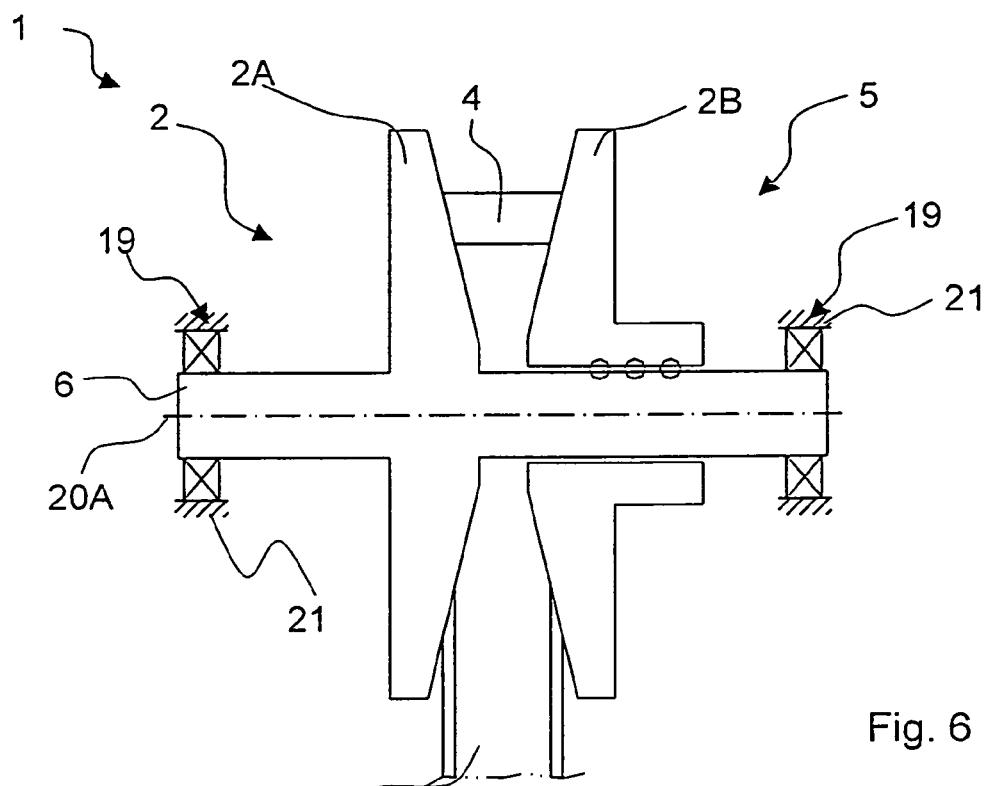
FIG. 6 is another embodiment of a conical disk set of a variator, shown very schematically from one viewpoint.
Figure 7:
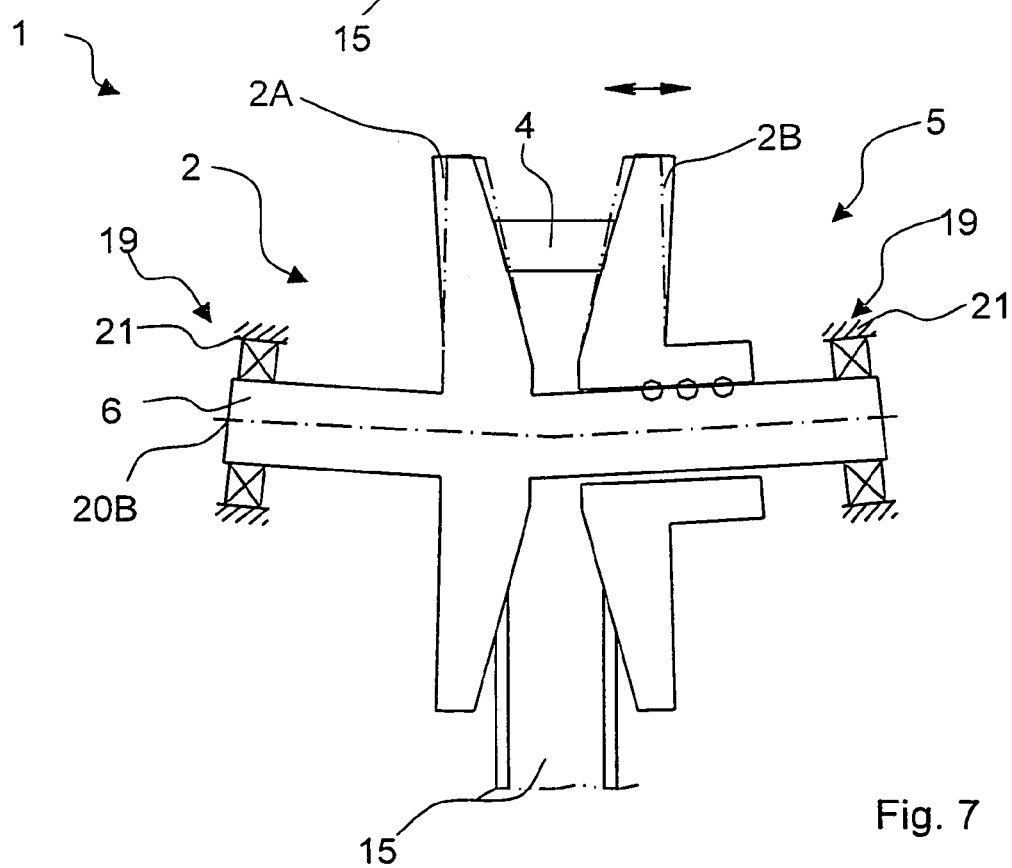

FIG. 7 is a conical disk set of FIG. 6, in which a shaft shows a definite sag as the result of high strand forces; and, FIGS. 8A-8E illustrate possible embodiments of a tilt actuator FIG. 1 shows an automatic transmission 1 with two conical disk sets 2 and 3, each having two conical disks 2A, 2B and 3A, 3B respectively. Between the conical disks 2A, 2B and the conical disks 3A, 3B a wrap-around element 4 is provided to transfer torque from the first conical disk set 2 to the second conical disk set 3.

The two conical disk sets 2, 3 and the wrap-around element 4 are components of a variator 5 of the automatic transmission 1, in this case formed as a continuously variable wrap-around transmission with a wrap-around element in the form of a dry composite band or belt 4, although the wrap-around element can also be a chain or a thrust-link band. The dry composite belt provided in this case has the advantage compared with chains or thrust-link bands that no oil is needed, and because of this the contact pressures for torque transmission are substantially lower.

In the section of the automatic transmission 1 shown schematically in FIG. 1, the conical disk 2B and the conical disk 3A are arranged so that they can be displaced relative to the conical disk 2A and the conical disk 3B, in the axial direction of their respective shafts 6 and 7 which in this case constitute a drive input shaft 6 and a drive output shaft 7. By changing the distance between the conical disks 2A, 2B or the conical disks 3A, 3B, the transmission ratio can be changed in a manner already known as such, whereby the radii on which the belt 4 runs on the conical disks 2A to 3B change. The adjustment process can be initiated by moving the conical disks 2A, 2B and 3A, 3B towards or away from one another by increasing an axial pressure force exerted by an axial actuator 28.

To effectively avoid an unacceptably large force increase for transmission ratio adjustment and increase the adjustment speed of the variator 5, the conical disk 3B is mounted rotationally fixed on the drive output shaft 7 on a synchronous-velocity joint 8 and can be tilted about a tilt axis 9.

When the conical disk 3B is tilted, the equidistant corresponding to the width of the belt 4, i.e., the respective contact line of the belt 4 with the two conical disks 3A, 3B of conical disk set 3 in the wrap-around area, which is at least approximately a circle when the conical disk 3B is not tilted, assumes at least approximately the shape of a spiral. Depending on the tilt direction of the conical disk 3B, the belt 4 screws outward or inward to a larger or smaller wrap-around radius or diameter relative to the conical disks 3A, 3B without any substantial increase of an axial pressure force on the belt 4.

The illustrated combination of axial mobility of the conical disks 2B and 3A and the ability of the conical disk 3B to tilt has the result that the variator 5, or the transmission ratio that can be set by the variator 5, can be changed to a desired different transmission ratio at high adjustment speed, the adjustment being effected essentially by the tilting movement of the conical disk 3B and the axial displacement of the conical disks being provided only in a supporting capacity.

Thus, the design of the variator 5 offers the possibility of adjusting the transmission ratio only by a tilting movement of the conical disk 3B, without bringing about an axial displacement of the conical disk 2B and/or of the conical disk 3A.

Thanks to the tilting of the conical disk 3B, namely the possibility of changing the arrangement between the rotation axes of the conical disks 3A, 3B, it is ensured that a transmission ratio adjustment is carried out without the action of unacceptably high pressure forces on the belt and the conical disks 2A to 3B, so that belt wear, undesirably high heat evolution and self-inhibition of the belt 4 are avoided or minimized in a simple manner.

The synchronous-velocity joint 8 is in this case made with a ball-shaped inner joint body 10 over which the conical disk 3B can tilt, so that the synchronous-velocity joint 8 acts as a radial bearing, axial bearing and swivel bearing for the conical disk 3B.

To transfer the torque, between the joint body 10 and the conical disk 3B, several locking elements 11 are provided in the form of hardened and ground balls, which sit in grooves (not shown in greater detail) ground into the surface of the joint body 10 and at the same time engage in the conical disk 3B in order to transfer the torque from the conical disk 3B to the drive output shaft 7.

In an embodiment (not shown) of the automatic transmission according to the invention which deviates from the above, it can also be provided that the locking elements 11 for torque transmission are made as sheet membranes, which are much cheaper to produce since they are neither hardened nor ground.

Further, in another design version of the automatic transmission according to the invention which deviates from the embodiment shown in the drawing, it can be provided that the rotationally fixed but tilt-movement-permitting joint between the conical disk 3B and the drive output shaft 7 is made elastic in such manner that the tilting movement of the conical disk 3B takes place only above a given pressure force between the conical disk 3B and the belt 4.

This counteracts in a simple manner any overload of the belt 4. Moreover, an appropriate design of the elastic joint between the drive output shaft and the conical disk can minimize too large a deviation of the equidistance from their ideal circular shape, and this advantageously increases the efficiency of the variator.

To tilt the conical disk 3B shown in FIG. 1 about its tilt axis 9, a tilt actuator device 26 acts upon a bearing 12 so that the conical disk 3B is pushed into or out of the plane of the drawing in the directions 13 or 14 represented in the area of the bearing 12 in FIG. 1, whereby the conical disk 3B undergoes a tilting movement about the tilt axis 9.

In addition there is the possibility of adjusting the bearing 12 by means of the tilt actuator device 26 in the direction of and away from the conical disk set 2 on the drive input side, as indicated by the direction arrows 23, 24, whereby the conical disk 3B can be tilted about a further tilt axis 22. This further tilt axis 22 is positioned perpendicular to the rotation axis of the conical disk 3A and to the slack or loaded strands 15 of the belt 4.

In a simple manner, this tilting movement that can be actively controlled by the tilt actuator device 26 counteracts a spreading of the conical disk set 3 or the conical disks 3A, 3B that corresponds to the current transmission ratio set at the variator 5 and to the actual torque transmitted by the variator 5.

The tilting of the conical disk 3B about the further tilt axis 22 in particular reduces or completely compensates a spreading of the conical disks 3A, 3B in a section of the wrap-around area in which the spreading is as a rule maximum. This effectively avoids a radial inward slippage of the belt 4 in the wrap-around area or in the section of the wrap-around area which appears with increasing spread of the conical disks 3A, 3B and, among other things, causes high pinching forces.

Obviously, it can also be provided that a tilting of one conical disk of a conical disk set with the aid of a tilt actuator device 26 to improve the efficiency of the automatic transmission takes place, in which the disk is tilted about a tilt axis arranged perpendicularly to the rotation axis of the tiltable conical disk, and such that the maximum tilt path of the conical disk in the direction of the other conical disk of a conical disk set coincides respectively with the maximum disk spreading of the conical disk set concerned. This means that the position of the further tilt axis varies in each case depending on the direction of a force acting on the conical disk set which results from the strand forces of the belt. In this, an additional tilt of the conical disk to produce a transmission ratio change of the variator in the manner described earlier by means of the tilt actuator device 26 or with a further actuator device 26, can be provided for.

Figure 8A:
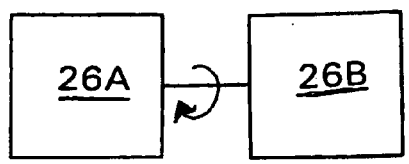
Figure 8B:
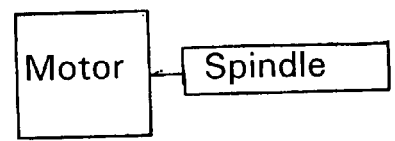

The tilt actuator device 26 for adjusting the arrangement of the rotation axis of conical disk 3B relative to the rotation axis of conical disk 3A is made as a linear drive and in this case, as illustrated diagrammatically in FIG. 8B, comprises an electric motor 26A with a spindle 26BA, to tilt the conical disk 3B about its tilt axis 9 and the further tilt axis 22. The maximum tilt or positional adjustment path of the bearing 12 is in a range from $\frac{1}{10}$ mm up to one or a few millimeters, depending on the application in each case.

Figure 8C:
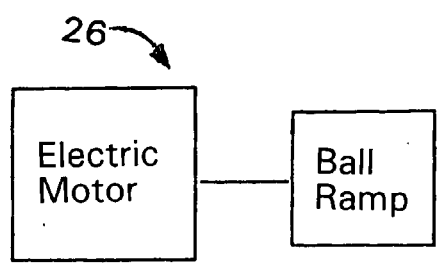
Figure 8D:
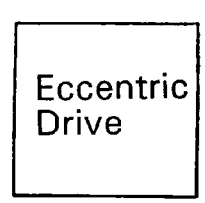
Figure 8E:
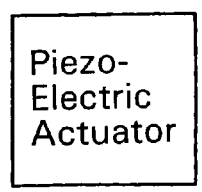

Alternatively, instead of the electric motor and spindle it is obviously possible to provide a tilt actuator device 26 comprising a piezoelectric control unit and to produce larger adjustment paths by means of an adjustment path enlarging system arranged between the active element of the piezoelectric unit and the bearing 12. Alternatively, the tilt actuator device 26 may comprise an electric motor driving a torque ramp, also referred to as a ball ramp, or an electric motor driving an eccentric drive. As diagrammatically in FIG. 8A, a linear drive, such as the tilt actuator, comprises a rotational drive device 26A, such as electric motor, and a rotational to linear motion converter 26B that converts the rotational output of the motor 26A into linear motion which may be used to tilt bearing 12. As shown in FIG. 8B, the actuator 26 is formed as a linear drive comprising an electric motor and a spindle. As shown in FIG. 8C. the actuator 26 is diagrammatically shown as a linear drive comprising an electric motor and a ball ramp. As shown in FIG. 8D, the actuator 26 is diagrammatically shown as an eccentric drive. As shown in FIG. 8E, the actuator 26 is diagrammatically shown as a piezoelectric actuator.

In the present case the bearing 12 is a grooved ball bearing, whereby any tilting movement of the outer ring of the bearing 12 during the adjustment of the bearing 12 relative to the linear drive is taken up by a coupling element arranged between the spindle and the outer ring of the bearing 12.

If the bearing 12 is made as a self-aligning roller bearing the coupling element is not needed, since tilt movements are compensated by a self-aligning roller bearing.

The tilting device as such can basically be arranged on the drive input or the drive output side, or on both axes.

Figure 2:
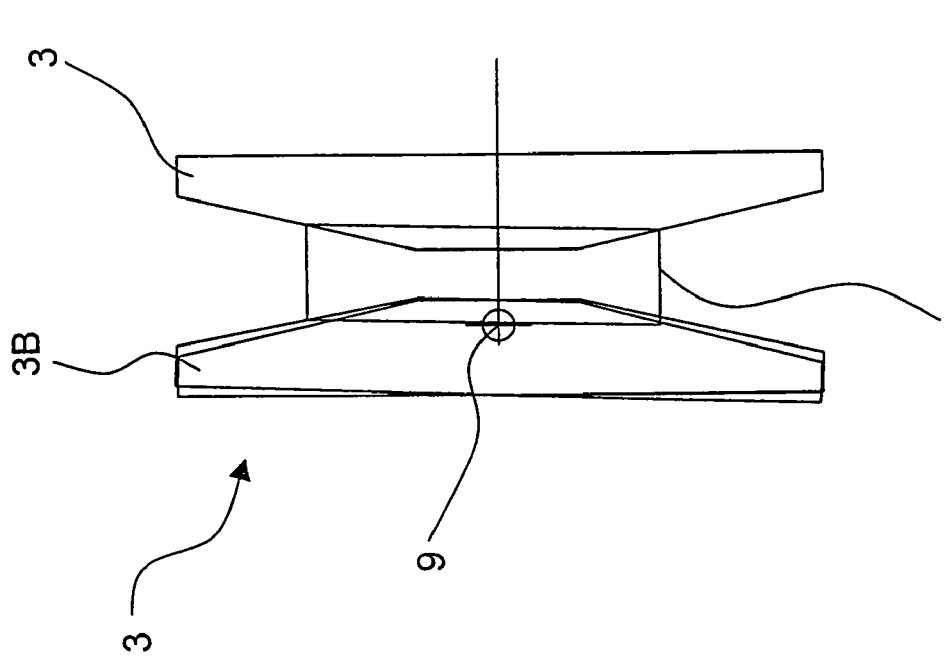
FIG. 2 is a conical disk set of a variator, shown very schematically from one viewpoint.

FIG. 2 shows the conical disk set 3 of FIG. 1, with the conical disk 3B represented at the same time in the untilted and tilted positions. Correspondingly, FIG. 3 shows the change of the run-in radius and the run-out radius of the belt 4 caused by the tilt movement of the conical disk 3B relative to the conical disk 3A, shown in FIG. 2, such that in the tilted position of the conical disk 3B the equidistant 16 has a spiral shape as shown in FIG. 3.

Figure 3:
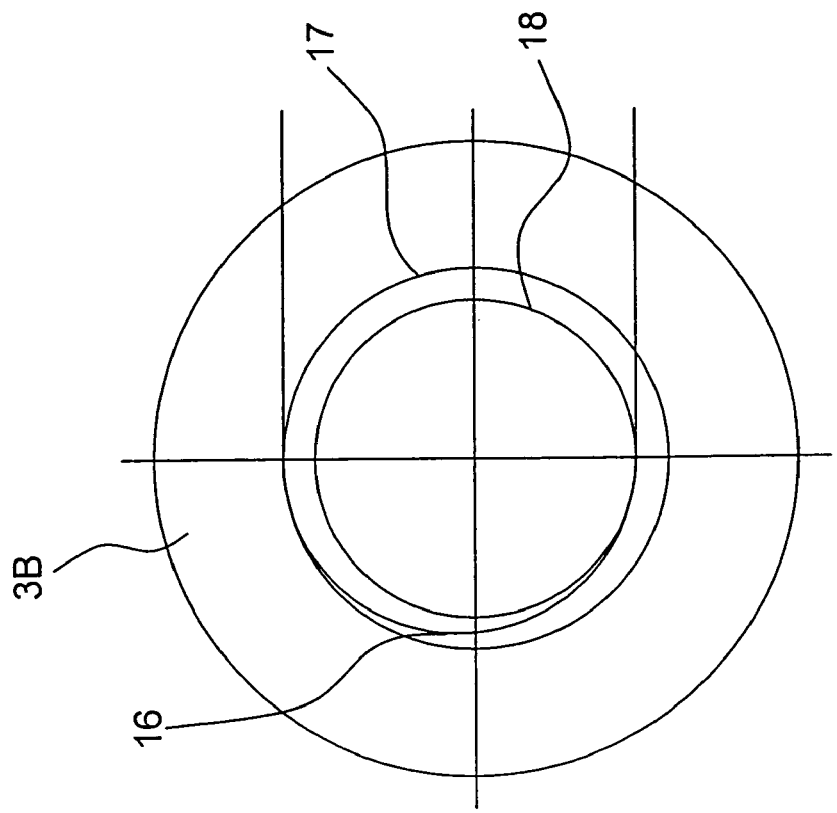
FIG. 3 is a side view of a conical disk of the conical disk set of FIG. 2.

FIG. 3 also shows a circle 17 whose radius corresponds to the wrap-around radius in the run-in area of the belt 4 of the conical disk set 3. Another circle 18, whose radius corresponds to the wrap-around radius of the belt 4 in the run-out area of the conical disk set 3, represents the ideal shape of the equidistant at the end of the transmission ratio adjustment.

Owing to the tilt movement of the conical disk 3B about its tilt axis 9, which is perpendicular to the rotation axis of the conical disk 3B and extends at least approximately parallel to a slack strand or a loaded strand 15 of the belt 4, starting from an aligned arrangement of the rotation axes of the conical disks 3A and 3B to an arrangement in which the rotation axes of conical disks 3A and 3B are at an angle to one another, the belt 4 screws from the radius of the circle 17 toward the radius of the other circle 18 until the shape of the equidistant 16 corresponds to the other circle 18 and the corresponding transmission ratio is set at the variator 5.

In a further embodiment of the automatic transmission according to the invention it can obviously also be provided that a transmission ratio adjustment and/or an efficiency increase of a variator are brought about solely by the tilting movement of a conical disk, and that an axial adjustment of the conical disks of a conical disk pair, as is necessary for a transmission ratio adjustment in the CVT systems known from the prior art, can be omitted. In this, the conical disks arranged movably in the axial direction respectively on the drive input and drive output shafts are combined with a so-termed torque ramp by means of which a torque-dependent contact pressure force between the conical disks and the belt 4 is adjusted.

In the embodiment of the automatic transmission 1 illustrated in the drawing an axial contact pressure force between the conical disks 2A, 2B and 3A, 3B and the belt 4 is also respectively applied via a torque ramp. The pressure force is produced in proportion to an applied torque and as a function of the adjustment path of the conical disk concerned, and thus also as a function of the currently set transmission ratio, such that the applied torque is transferred to roller elements of the torque ramp in a manner known as such. Owing to the arrangement of the roller elements in the area of the conical disks 2B and 3A, the applied torque is converted to an axial contact pressure force acting on the conical disk sets 2, 3 and the belt 4 without the occurrence of a transmission ratio change during this.

Moreover, it is also possible for more than one conical disk of the variator to be designed to tilt. Thus, it can easily be provided that both disks of a conical disk set are made to tilt.

Furthermore, it is obviously a matter for the discretion of a person with knowledge of the field to construct an automatic transmission according to the invention with a variator in which at least one conical disk can move in translation in the radial direction of the conical disks and/or a rotation axis of one conical disk can move with a wobbling or oscillating motion relative to the rotation axis of the second conical disk of a conical disk set, so that the arrangement of the rotation axes of the two conical disks of a conical disk set is varied and a transmission ratio adjustment is carried out and/or, in general, the efficiency of the automatic transmission is improved.

In addition, in a variant embodiment it can also be provided that the individual conical disks are made to be movable also in the axial direction by an axial actuator 28 comprising, for example, hydraulic control elements, in order to vary a perpendicular distance between the conical disks of a conical disk set in a manner known as such and thereby increase the adjustment speed of the variator still further.

Figure 4:
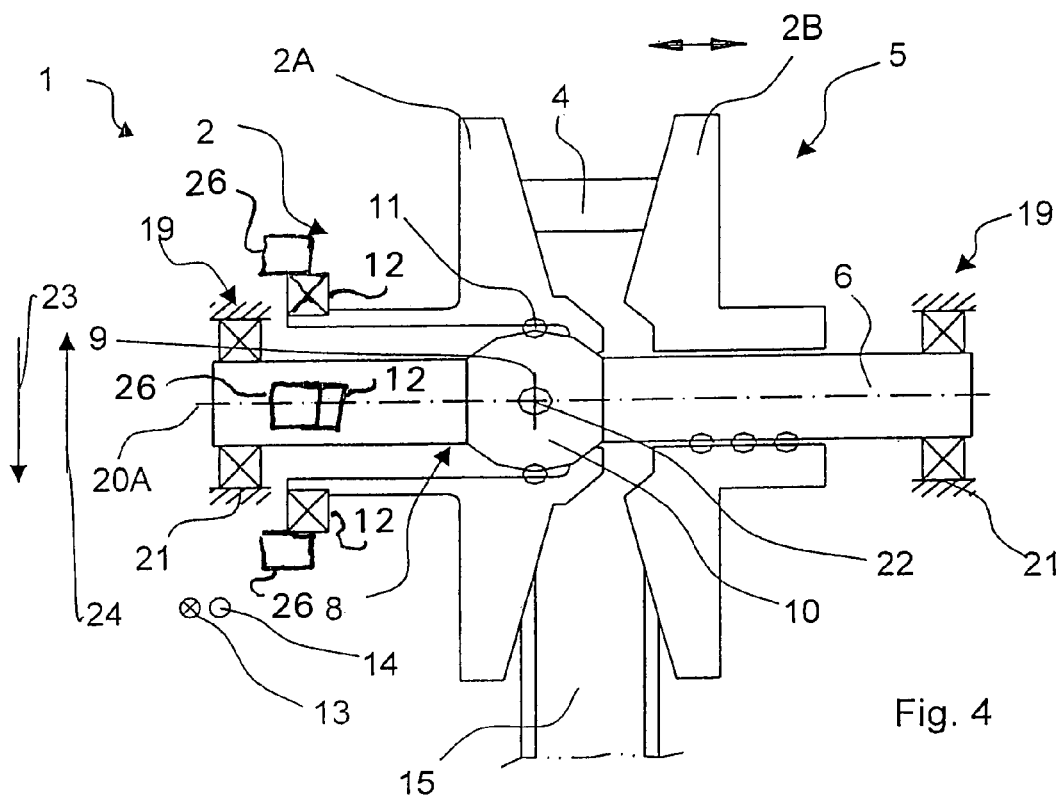
FIG. 4 is a conical disk set of a variator, shown very schematically from one viewpoint.

Essentially, it is up to the discretion of a person with knowledge of the field to combine the various options described above for varying the arrangement of the rotation axes of the two conical disks of a disk set relative to one another, appropriately as a function of the application in each case, such that the conical disks can be made tiltable and/or adjustable in the radial direction of the conical disks and/or with rotation axes that can wobble or oscillate and/or so that the disks can be displaced axially Referring now to FIG. 4, the conical disk set 2 of the variator 5 is shown with a conical disk 2B that can move in the axial direction and a conical disk 2A that can tilt. In this, a bearing 19 of the drive input shaft 6 is made elastic in such manner that with increasing strand forces of the belt 4 the drive input shaft 6 and so too the conical disk set 2 are pushed toward the other conical disk set 3 (not shown in FIG. 4).

Figure 5:
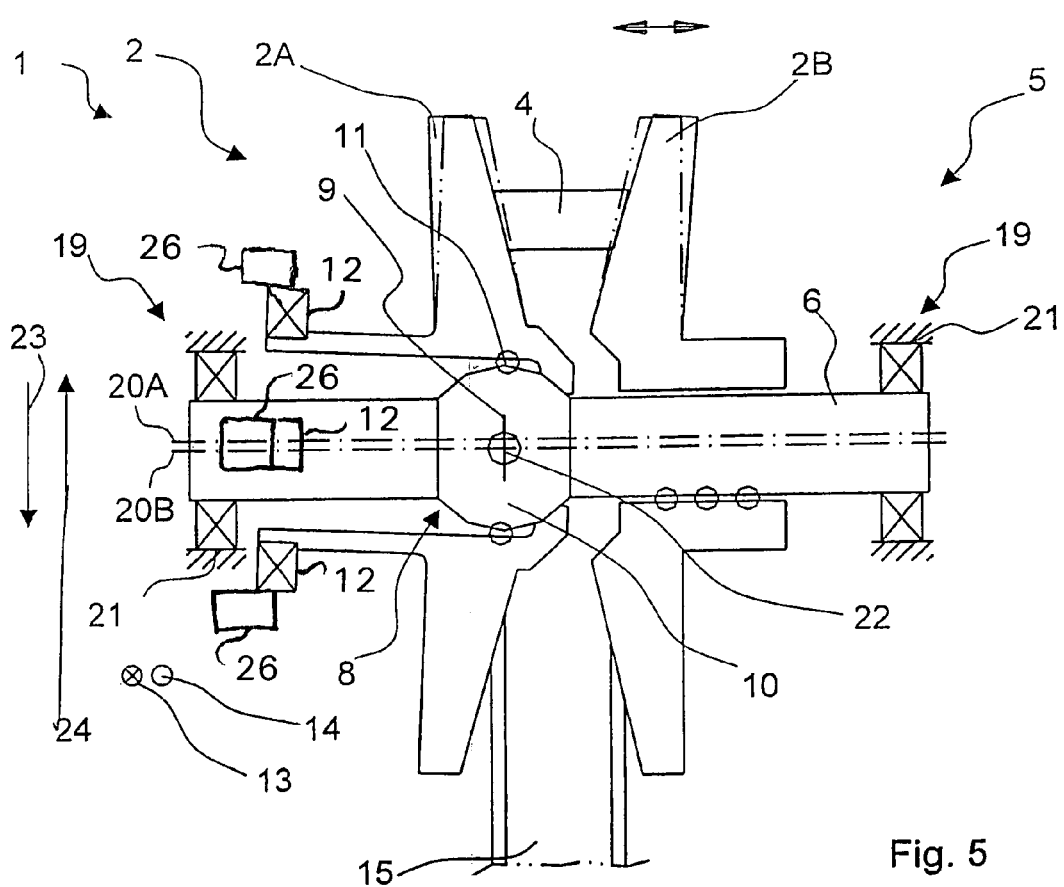
FIG. 5 is a conical disk set of FIG. 4, showing the displacement of a shaft as the result of high belt strand forces.

FIG. 5 shows the conical disk set 2 in a displaced position compared with that shown in FIG. 4, this displacement being caused by high strand forces acting on the conical disks. To clarify the changed position of the drive input shaft 6 compared with FIG. 4, in FIG. 5 a rotation axis of the drive shaft 6 is shown respectively in its original position 20A and in the new, displaced position 20B.

The displacement of the drive input shaft 6 results from an elastic deformation of a bearing housing 21 of the bearing 19. The bearing 12 decoupled from the bearing 19 of the drive shaft 6 remains at least approximately in its original position, so that the conical disk 2A is tilted about a further tilt axis 22 in the manner shown in FIG. 5. The further tilt axis 22 is perpendicular to the rotation axis of conical disk 2A and to the slack strand or loaded strand 15 of the belt 4.

The displacement of the drive input shaft 6 shown in FIG. 5 is the displacement that can be depicted in the plane of the drawing, with the displacement of the drive shaft 6 taking place in the direction of the resultant force given by the sum of all the strand and wrap-around forces occurring in the wrap-around area of the conical disk set 2. The direction of this resultant force can point anywhere in space such that the main direction of its action is toward the other conical disk set 3 (not shown).

Owing to the spherical structure of the synchronous-velocity joint, when the drive input shaft is displaced there occurs a corresponding tilt of the conical disk 2A, which counteracts a spiral course of the belt 4 between the two conical disks 2A, 2B that is caused by spreading of the conical disks which leads to losses and reduces the efficiency of the automatic transmission. The spreading of the conical disks 2A, 2B takes place because of high belt strand forces and the component elasticities of the conical disks 2A, 2B in FIG. 5, in which the dot-dash lines reproduce the positions of the conical disks 2A, 2B shown in FIG. 4 and the continuous lines show the conical disks 2A, 2B in their deformed condition.

With increasing strand forces, the defined elastic deformability of the bearing housing 21 of the bearing 19 of the drive input shaft 6 brings about a nominal disk pre-tilt which is a function of the disk spreading to be expected. The expected spreading of the conical disks 2A, 2B depends in each case on the currently set transmission ratio at the variator 5 and the strand forces. The strand forces are supported by the bearing 19 of the drive input shaft 6 and the bearing (not shown) of the drive output shaft 7.

The embodiment of the automatic transmission 1 gives a direct relationship between the axial forces of the drive input and drive output shafts 6 and 7 and a disk pre-tilt, with which the radially inward slippage of the belt 4 and the high pinching forces resulting therefrom are avoided by simple means. This considerably reduces the loading of the belt 4 so that belt wear is decreased and the life of the belt is increased.

The pre-tilt of the disks is adjusted such that a real course of the belt 4 in the wrap-around area of the conical disk set 2, which has a negative effect on the life of the belt 4, is changed toward an ideal, preferably semicircular-shaped course in the wrap-around area.

A further embodiment of the automatic transmission 1 is shown in FIGS. 6 and 7, the conical disk set 2 being shown in FIG. 6 in a condition of low torque transfer and small strand forces. This corresponds to negligible deformation of the drive input shaft 6, so that the conical disks 2A, 2B are at least approximately parallel to one another. In this case the conical disk 2A is made integrally with the drive input shaft and the conical disk 2B can be displaced in the axial direction of the drive shaft 6 and is arranged rotationally fixed to the shaft 6. The axial displacement of the conical disk 2B is effected by an axial actuator(not 4 shown), in order to enable a desired or necessary transmission ratio adjustment to be carried out by the conical disk set 2 and hence by the variator 5.

If the torque to be transmitted increases, the strand forces of the belt 4 acting on the conical disk set 2 also increase, and this results in a corresponding elastic deformation of the drive input shaft 6. The elastic deformation of the drive input shaft 6 results in tilting of the two conical disks 2A, 2B, leading to the change of their positions shown in FIG. 7. In addition, it can be seen from the representation of FIG. 7 that because of their component elasticities and the strand forces, the conical disks 2A, 2B undergo additional elastic deformation. For a clearer understanding, the untilted and undeformed conditions of the conical disks 2A, 2B are indicated in FIG. 7 by dot-dash lines. At the same time the full-line representation of the conical disks 2A, 2B shows their new positions and deformed conditions.

The respective disk spreading shown in FIGS. 5 and 7, expected during the operation of the automatic transmission 1, depends on the currently set transmission ratio of the variator and the strand forces occurring, such that by virtue of an elastic deformation of the drive input shaft 6 that corresponds to the loading of the components of the variator 5, a defined disk pre-tilt can be set. For this, in particular a plane moment of inertia of the drive input shaft as a function of its length, that is to say a variation of the plane moment of inertia of the drive input shaft 6 in the axial direction thereof, is established in such manner that a disk pre-tilt which increases the efficiency of the variator 5 takes place as a function of a sag or deformation of the drive input shaft 6, which in turn depends on the currently set transmission ratio and the strand forces. The variation of the plane moment of inertia of the drive input shaft 6 can be produced by a corresponding diameter design of the shaft 6, by a hollow shaft profile, or by other appropriate design measures.

In all the illustrated embodiments of an automatic transmission according to the invention, a spiral course of the belt in the wrap-around area of the conical disk sets 2, 3 is advantageously deliberately reduced or, for adjustment of the transmission ratio, produced in a controlled way, in such manner that the variator 5 or automatic transmission 1 operates with higher efficiency and as a result the fuel consumption of a vehicle can be reduced. Moreover, the reduction of the pinching forces decreases the heating of the belt 4 so that the belt 4 as a whole can withstand higher loads. This advantageously also enables higher torques to be transferred via the variator 5 from the drive input shaft 6 to the drive output shaft 7. In addition, the reduced belt wear extends the life of the belt 4.

Reference Numerals

1 Automatic transmission
2 Conical disk set
2A,B Conical disks
3 Conical disk set
3A,B Conical disks
4 Belt
5 Variator
6 Drive input shaft
7 Drive output shaft
8 Synchronous-velocity joint
9 Tilt axis
10 Joint body
11 Locking elements
12 Bearing
13 Adjustment direction
14 Adjustment direction
15 Slack strand, loaded strand
16 Equidistant
17 Circle
18 Further circle
19 Bearing
20A,B Rotation axis of the drive input shaft
21 Bearing housing
22 Further tilt axis
23 Direction arrow
24 Direction arrow

The invention claimed is:

1. An automatic transmission with a variator, the transmission comprising:
   a belt coupled between first and second conical disks of a first disk set and first and second conical disks of a second disk set for torque transfer between the first and the second disk sets;
      wherein a continuously variable transmission ratio is determined by a ratio between a first radius of the belt, at the first disk set, and a second radius of the belt, at the second disk set;
      the first one of the conical disks of the first disk set being rotatable and axially fixed and tiltable on a shaft (7) and the second one of the conical disks of the first disk set being rotatable and axially moveable along the shaft;
   a tilt actuator acting on the first conical disks of the first disk set for varying a tilt angle between rotation axes of the first and the second conical disks, whereby
      a variation of the tilt angle between the axes of rotation of the first and the second conical disks of the first disk set causes the first radius of the belt, at the first disk set, and the second radius of the belt, at the second disk set, to one of increase and decrease along a generally spiral path from a first transmission ratio to a second transmission ratio;
      the first conical disk only tilts after achieving a certain contact pressure force between the first conical disk and the belt; and
      the rotatable and axially fixed and tiltable connection between the first conical disk and the shaft is elastic and the tilt actuator acts upon a bearing that supports the first conical disk to tilt the first conical disk relative to the second conical disk.

2. The automatic transmission according to claim 1, wherein the rotatable and axially fixed and tiltable connection is a synchronous-velocity joint.

3. The automatic transmission according to claim 1, wherein at least one of a first conical disk of the at least one conical disk set is displaceable in translation relative to a second conical disk thereof and the second conical disc of the conical disk set is movable relative to the first conical disk thereof in such a manner that there is an offset between the rotation axes of the conical disks in the radial direction of the disks of a conical disk set.

4. The automatic transmission according to claim 1, wherein the first one of the conIcal disks of the second disk set is rotatable and axially fixed and tiltable on a shaft and a second tilt actuator acts upon the first conical disk of the second disk set to vary the tilt angle between the rotation axes of the conical disks of the second conical disk set.

5. The automatic transmission according to claim 4, wherein the actuator is a piezoelectric actuator.

6. The automatic transmission according to claim 4, further comprising an axial actuator responsive to at least one of the tilt actuator and a change in the first radius of the belt at the first disk set for proportionally changing an axial distance between a least the first and the second conical disks of the first disk set and an axial distance between the conical disks of at least one of the first and the second disk sets is varied such that at least one conical disk of at least one of the disk sets is moved in an axial direction of a shaft relative to a corresponding conical disk of the at least one conical disk set.

7. The automatic transmission according to claim 4, wherein only one of the conical disks, of each of the first and the second conical disk sets is displaceable in the axial direction of a corresponding shaft.

8. The automatic transmission according to claim 1, wherein at least the first conical disk of the first conical disk set is tiltable relative to the second conical disk of the first conical disk set.

9. The automatic transmission according to claim 8, wherein the first conical disk of the first conical disk set tilts about a tilt axis arranged perpendicularly to rotation axis of the first conical disk of the first conical disk set.

10. The automatic transmission according to claim 9, wherein the tilt axis extends least approximately parallel to the belt.

* * * * *